(12) United States Patent
Schultz

(10) Patent No.: US 6,917,911 B2
(45) Date of Patent: Jul. 12, 2005

(54) SYSTEM AND METHOD FOR VOICE USER INTERFACE NAVIGATION

(75) Inventor: Paul Thomas Schultz, Florissant, CO (US)

(73) Assignee: MCI, Inc., Ashburn, VA (US)

( * ) Notice: Subject to any disclaimer, the term of this patent is extended or adjusted under 35 U.S.C. 154(b) by 397 days.

(21) Appl. No.: 10/076,323

(22) Filed: Feb. 19, 2002

(65) Prior Publication Data

US 2003/0158727 A1 Aug. 21, 2003

(51) Int. Cl.[7] ............................................. G10L 21/06
(52) U.S. Cl. .................... 704/206; 704/209; 84/600; 84/622
(58) Field of Search ................................ 704/205, 206, 704/207, 209, 221; 84/600, 622

(56) References Cited

U.S. PATENT DOCUMENTS

| | | | | |
|---|---|---|---|---|
| 5,262,581 A | * | 11/1993 | Sharp | 84/603 |
| 5,375,501 A | * | 12/1994 | Okuda | 84/611 |
| 5,703,311 A | * | 12/1997 | Ohta | 84/622 |
| 6,208,959 B1 | * | 3/2001 | Jonsson et al. | 704/209 |
| 6,601,031 B1 | * | 7/2003 | O'Brien | 704/270.1 |

* cited by examiner

Primary Examiner—Abul K. Azad

(57) ABSTRACT

A Voice User Interface (VUI) or Interactive Voice Response (IVR) system utilizes three levels of navigation (e.g. Main Menu, Services, and Helper Commands) in presenting information units arranged in sets. The units are "spoken" by a system in a group to a human user and the group of information at each level is preceded by a tone that is unique to the level. When navigating the levels, the tones of the levels are in a musical progression, e.g. the three-note blues progression I, IV, V, for preceding the groups of information, respectively. The musical progression returns to the tonic of the musical key when the navigation returns to the level one of the first group of information.

11 Claims, 6 Drawing Sheets

FIGURE 3

104 - TRANSMIT LEVEL THREE INFORMATION
WITH TONALITY THREE, e. g. IN THE KEY OF 'A':

"My Preferences
What's Available
Help
Services
Cancel
Repeat
Login
Get Details
Errors
Operator
WorldCom Center
Go Back"

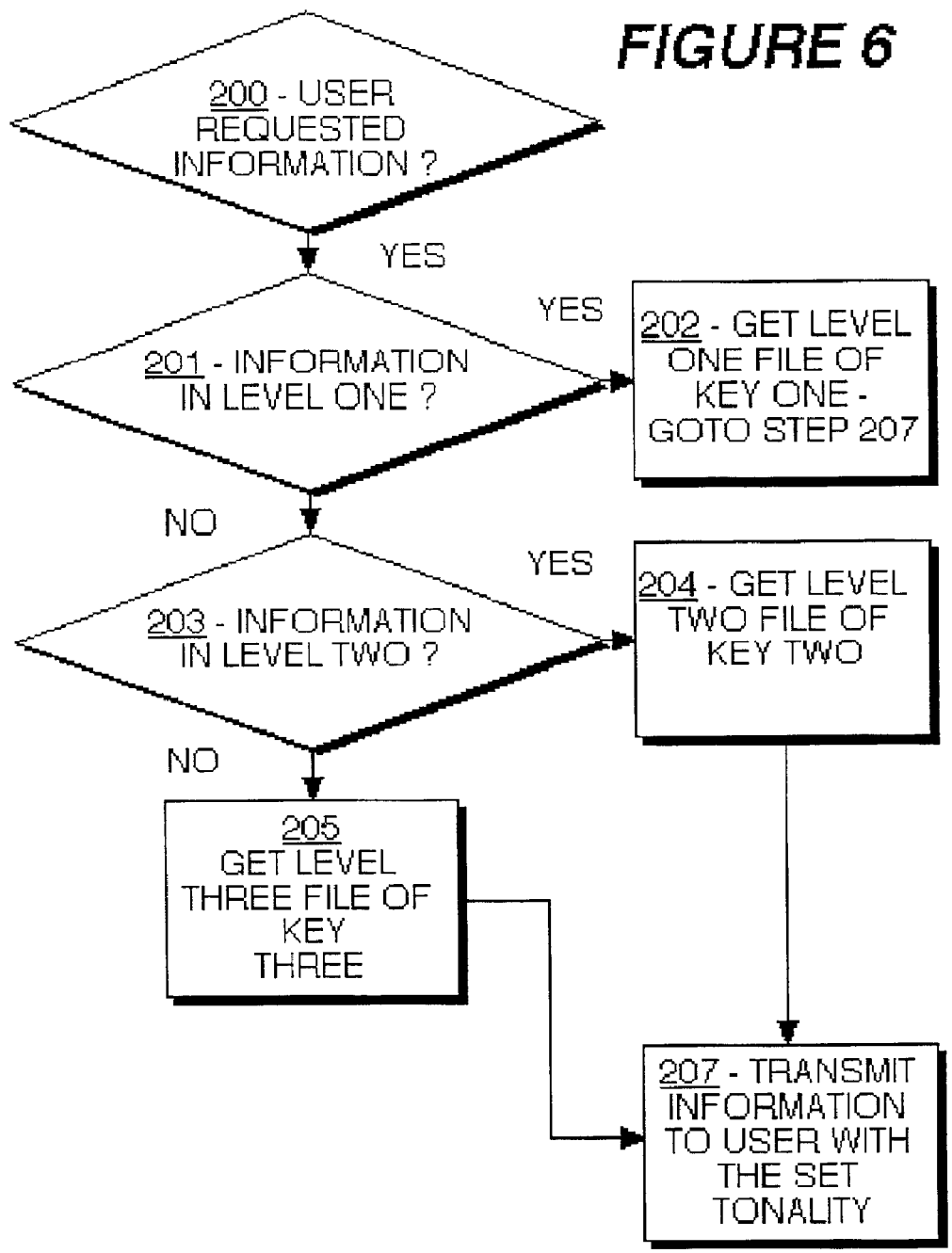

SYSTEM AND METHOD FOR VOICE USER INTERFACE NAVIGATION

FIELD OF THE INVENTION

The present invention relates to a human user interface with a machine, process or article and more particularly to a Voice User Interface (VUI) or an Interactive Voice Response (IVR).

BACKGROUND OF THE INVENTION

A human user interface with a machine, process or article may be conducted using various channels or lines, such as audio, visual, touch or a combination of these. The present invention relates to an interface that includes at least audio communication via an audio line or channel from the machine, process or article to a human user.

As an example, a Voice User Interface (VUI) or an Interactive Voice Response (IVR) are well-known and fast-growth areas of technology, such that numerous companies are attempting to solve the same problems.

Non-verbal audio (sound effects and music) are used to aid VUI navigation. Sound Effects/Music can be used as an "Icon" to identify a Service, for example, and for "Latency Sounds" (Sound Effect/Music which is played while the system fetches information content). In a VUI, the human user issues a voice command for information. Such a command is to cause the performance of a function by the execution of a step. The receiver of the command then performs the function by executing the step and transmits the resulting information by voice.

Interactive Voice Response (IVR) uses a touchtone telephone to communicate with a remote compute, which uses a computerized voice to read back information.

Therefore, there is a need for an improved voice interface between a system and a human.

SUMMARY OF THE INVENTION

These and other needs are addressed by the present invention.

The interface of the present invention provides information to a user with a signal of tonality unique to the group, or more particularly the level, of that information, whereby the user is more aware of navigation, or more particularly browsing, within the system for improved user friendliness.

User friendliness, for electronic equipment and systems, is the quality of being easy for people (humans) to operate and is the ease with which a machine, especially a computer system, can be operated by people.

Due to the lack of any visual elements relevant to navigation in VUIs (for example, a Voice Portal) and IVRs, knowing where the user is in a VUI or IVR dialog with a system is a challenging problem. That is, there is a problem of VUI users (e.g. Voice Portal callers) and IVR users not knowing where they are in VUI or IVR navigation through a system that has groups, e.g. levels of information, the levels being the result of a classification or other organization of the information being sought by the users. The present invention recognizes the problem of the user not knowing where they are in navigating a system that provides information audibly, and analyzes the problem to determine that this is caused by the lack of any visual, or more broadly sensory elements, relevant to navigation.

As a solution to the problem of knowing where the user is in a dialog (navigation, including browsing), the present invention uses music tonality to provide intuitive audio cues in the system supplied information, which results in an improved users' ability to communicate over the interface. This solution works for any private, personal, government or commercial agency and with any machine or system having voice response providing information to a human user. The commands provided by the user may be from a keyboard, from a number pad, from a touchtone telephone, by voice or the like, which is not critical to the invention. The invention is most useful and intuitive when used in a human user/non-human dialog, most specifically of a voice-driven access in VUIs, for example, a Voice Portal, of a touchtone telephone driven access in IVRs.

The present invention is described in the preferred embodiment and best mode of a Voice Portal, wherein there are specific unique problems and causes, as analyzed above and which analysis is a part of the present invention.

However, the invention more broadly extends to any user commanding/voice (human voice or a facsimile thereof) responding interface (user command and system voice response interface), for example: web page, IVR, VUI (e.g. voice portal), home appliances, industrial systems, services for the blind, and a robot. The user in the present invention is directly or indirectly a human that can benefit from the unique tonalities.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a more detailed presentation of the transmit level three information step of FIG. 1;

FIG. 6 is a flow chart of the processing of an audio communication for a user audio interface of FIG. 5.

DESCRIPTION OF THE PREFERRED EMBODIMENT

Figure 1:
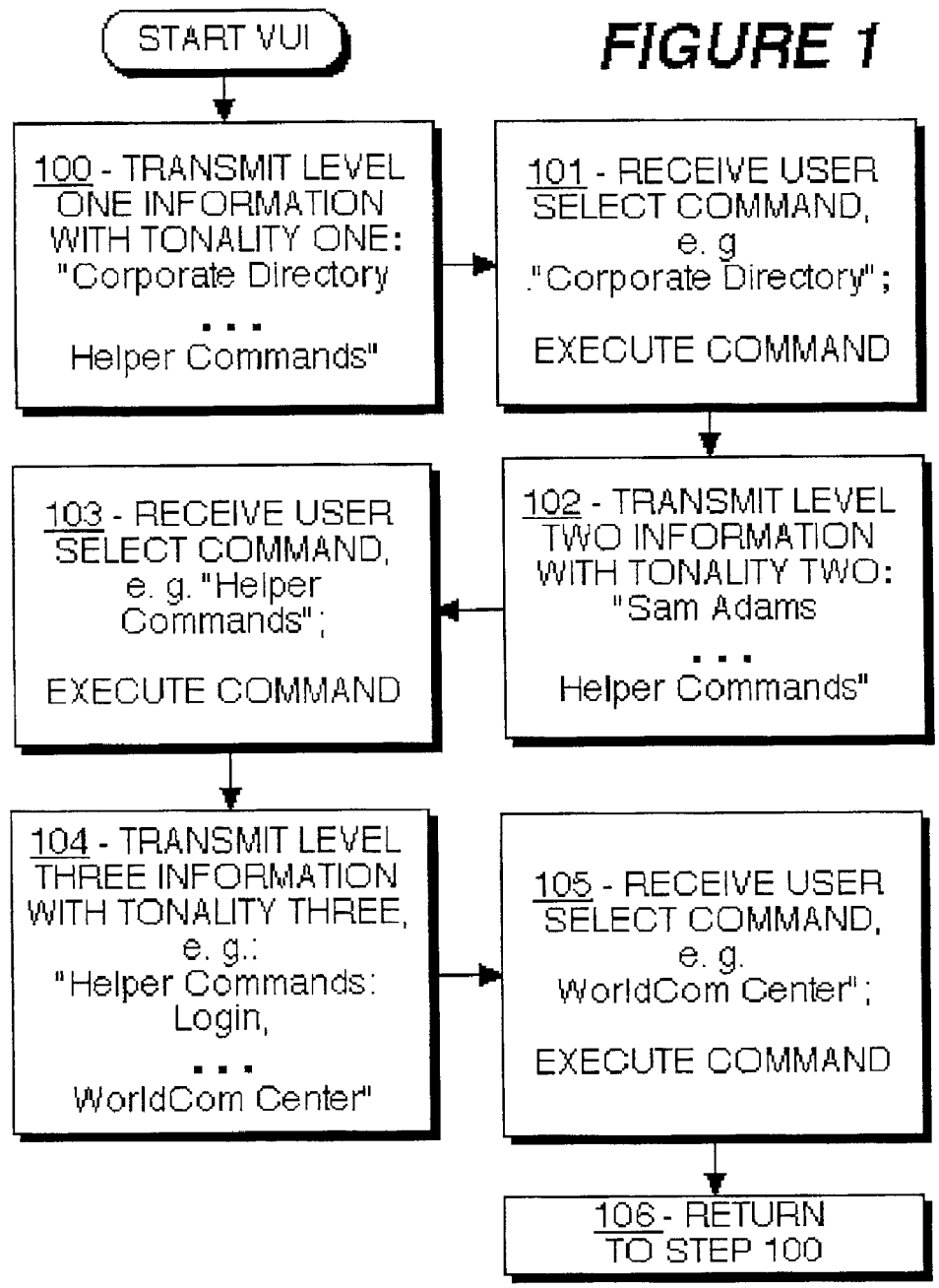
FIG. 1 describes one navigation example, as a flow chart, in a Voice Portal navigation, according to an embodiment of the present invention.

A system, method and software for a VUI are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The preferred embodiment VUI utilizes three levels of navigation, respectively having three groups of information (i.e. Main Menu, Services, and Helper Commands). The navigation is intuitive because it is based on audio cues correspondingly using the three first notes of a chord progression preferably the I, IV, V chords of a key, which chords are predominately used in blues or old time musical chord progressions). Each level of computer communication starts with the tonic note of the key, which note is unique to that level and which key is common to all levels, prior to the computer system voicing the syllables or words on the information provided at that level. Thus, when returning to the main or first level, the progression always returns to the tonic of the key. This invention improves upon the known voice portals and multi-device access frameworks, providing a mechanism for new and improved voice interfaces to systems and services.

In repeater systems, tone-burst entry is a known technique whereby a short tone signal is used at the start of a transmission to trigger a particular repeater so that all repeaters in the system will not go into operation simultaneously. Such a system uses a tone-burst generator, having an oscillator and associated circuitry for producing a tone burst of a tone unique to the particular repeater. This known system does use unique tones for identification, as does a tone dialing telephone system, but the known systems are used to distinguish commands to a machine, not as in the present invention to distinguish levels of provided information in a navigated system; also these known systems transmit to a non-human user, i.e. a machine, not as in the present invention to a human.

Tonality refers to the tone (dominant pitch or frequency) and timbre (relative harmonic content) of a sound other than noise. Timbre is a function of the instrument used to make or generate the tone. Even though a violin, horn, piano, and the voices of two different people may generate a "middle C", that is the exact same tone, for example, they are very distinguishable due to their unique timbres. Therefore timbre and tone may each be used to assist in navigation. The preferred embodiment relates to tone, used alone or in combination with other aids, such as timbre.

The tonality is preferably that used in the culture where the invention is to be practiced. For example, western music tonality is well known throughout the western culture and therefore preferably would be used where the western culture is well known. Western music (and more specifically blues music that evolved from the call/response nature of the field holler) uses this concept and it is widely accepted/understood by all people of western cultures. This well-known western music convention of tonality always returns to the base of a key or "tonic". The tonic is the first and most important note of a major or minor scale, to which all other notes in the scale bear a subordinate relationship. The key is named after the tonic, e.g. the key of D of the present example is named after its first note and contains the notes of D, E, F#, G, A, B, C#, D (one octave higher). The tonic is represented by the Roman numeral I. Tonality denotes the presence of a central key in a musical composition. If the music moves to a different key (modulation), it is expected to return to the original key (called the tonic). Tonality gives the ear a "center", providing a context in which melody and harmony have "meaning." It is this analysis, which is part of the present invention, that explains why the preferred embodiment (best mode) is so successful in improving navigation within a system having a VUI.

The known "NBC" (National Broadcasting Company) announcement uses notes of a chord within a key to pleasantly present the three letters, but does not use tonality to provide any practical information and has nothing to do with navigation or the identification of groups or levels of information being provided.

Figure 4:
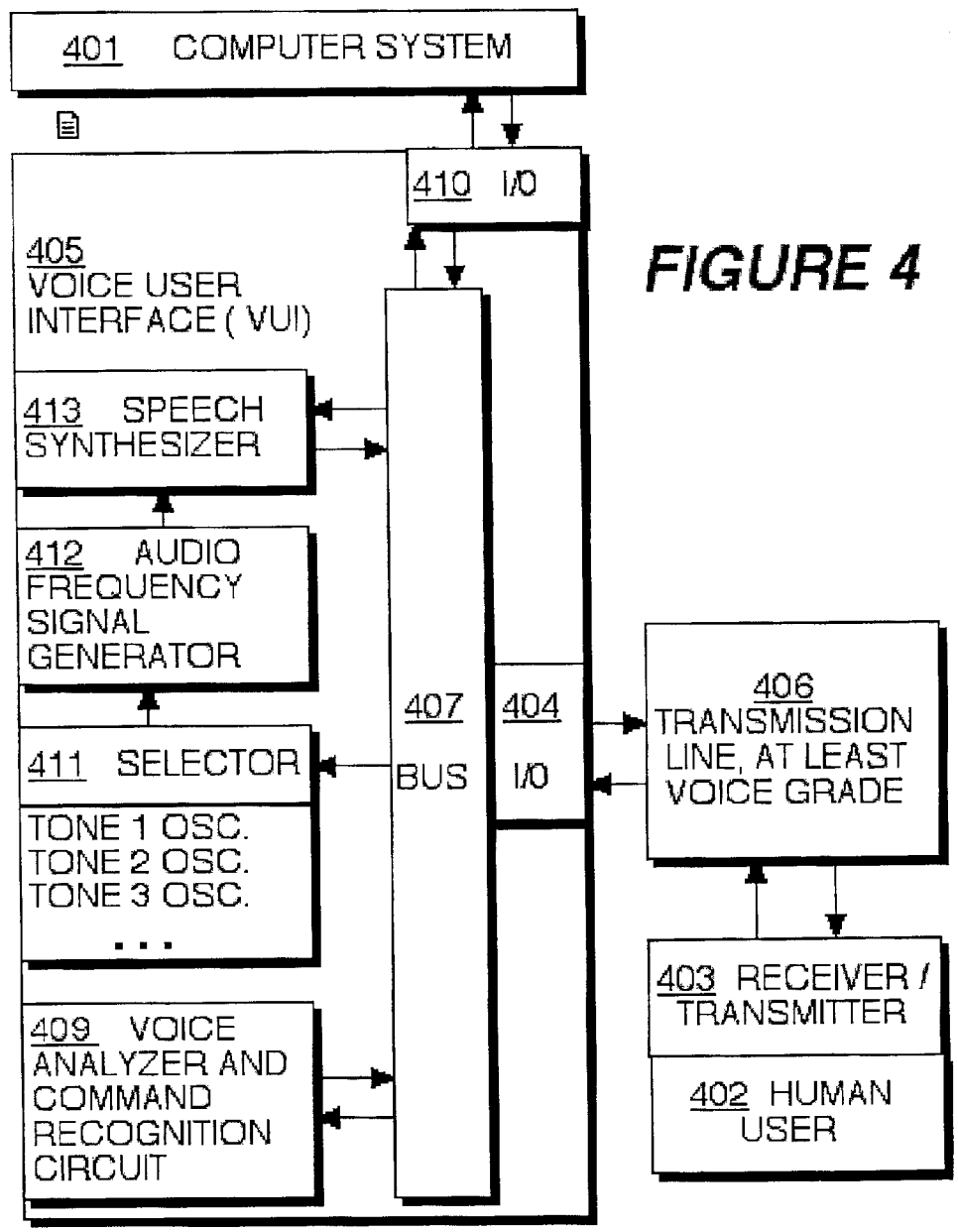
FIG. 4 is a schematic of apparatus to implement an embodiment of the present invention.

FIG. 4 is in totality the VUI or information system of the present invention according to the embodiment with a voice synthesizer, and comprises a schematic showing connection of per se currently standard, well known components (or their equivalents as determined by the guidance of their function within the inventor's problem, cause and solution analysis) operable in an information environment. Preferably, the information environment is a computer system wherein a general purpose computer is programmed according to FIGS. 1 to 3.

FIG. 1 describes one example of a dialog with and navigation of a 'WorldCom Center' Voice Portal equipped with the present invention. There are three levels of navigation or organizational levels of information, as follows:

Step 100, FIG. 1: Level 1, "WorldCom Center": This is the "Main Menu" or start of the VUI. Users may invoke services ('Corporate Dialer', 'Conference Call Scheduler', 'News', 'Stock', etc.) or Helper Commands ('Log In', 'Help', etc.) from here, and they may return to this starting point at any time (by saying 'WorldCom Center'). This level of the VUI is in the base musical key of "D" starting with the tonic "D". 'WorldCom Center', for example, is one set of information units, involving three words as units or four syllables as units. The individual units are spoken by the speech synthesizer 413 of FIG. 4 or obtained from a recording, not shown, within the VUI. The thus spoken information units of the set "WorldCom Center" follow the I tone D, which tone is the tonic in the key of D.

Step 101, FIG. 1: After hearing the voice transmission of sets of the information in group one, in the example at Level one, the human user speaks a user select command, from among those that were voice presented at step 100. The system apparatus 401, 405 of FIG. 4 receives the user select command, recognizes the command and executes the command. For example, with the user command of "Corporate Directory" the group two information of level two is provided to the I/O 410 of the VUI 405 from the computer system 401 of FIG. 4.

Step 102, FIG. 1: Level 2, "Services": This level is where users interact with a service ('Corporate Directory' in the example). From here, users may invoke Service commands (e.g. "Sam Adams . . . Helper Commands) or return to the "Main Menu" (by speaking the command 'WorldCom Center'). This level two of the VUI is in the base musical key of "D". 'Corporate Directory', for example, is one set of information units, involving two words as units or seven syllables as units. The individual units are spoken by the speech synthesizer 413 of FIG. 4 or obtained from a recording, not shown, within the VUI. Thus spoken information units of the set "Corporate Directory" follow the IV tone G, which tone is the fourth tone in the key of D.

Step 103, FIG. 1: After hearing the voice transmission of sets of the information in group two at Level two, the human user speaks a user select command, from among those commands that were machine voice presented by way of example in operation 102. The system apparatus 401,405 of FIG. 4 receives the user select command, recognizes the command and executes the command. For example, with the user command of "Helper Commands", the group three information of level three is provided to the I/O 410 of the VUI 405 from the computer system of FIG. 4.

Step 104, FIG. 1: Level 3, "Helper Commands . . . WorldCom Center": This level is where users interact with the Helper Commands listed in more detail in FIG. 3, in the example. Helper Commands may be invoked from any level. From here, users may invoke any one of the Helper Commands or return to the "Main Menu" (by speaking the command 'WorldCom Center'). This level three of the VUI is in the base musical key of "D" or tonic of "A". "Log In", for example, is one set of information units, involving one word as a unit or two syllables as units. The individual units are spoken by the speech synthesizer of FIG. 4 or obtained from a recording, not shown, within the VUI 405. The thus spoken information units of the set "Log In" follow the V tone "A", which tone is the fifth tone in the key of D". The user is returned to the level from which the Helper Command was invoked, or the user may return to the "Main Menu" ('WorldCom Center').

While the preferred embodiment is described with respect to the key of "D", other musical progressions of the tones of the another key, e.g. of "A", are contemplated, for example the first tones of the I, IV, V cords, namely "A", "D", "E".

Step 105, FIG. 1: After hearing the voice transmissions of sets of the information in group three, in the example at Level three, the human user speaks a user select command, from among those commands that were voice presented for operation 102. The system apparatus 401, 405 of FIG. 4 receives the user select command, recognizes the command and executes the command. For example with the user command of "WorldCom Center" the group one information of level one is provided to the I/O 410 of the VUI 405 from the computer system 401 of FIG. 4.

Step 106, FIG. 1: In the example, with the "WorldCom Center" command selected by the user, return is to the operation 100 of FIG. 1.

Figure 2:
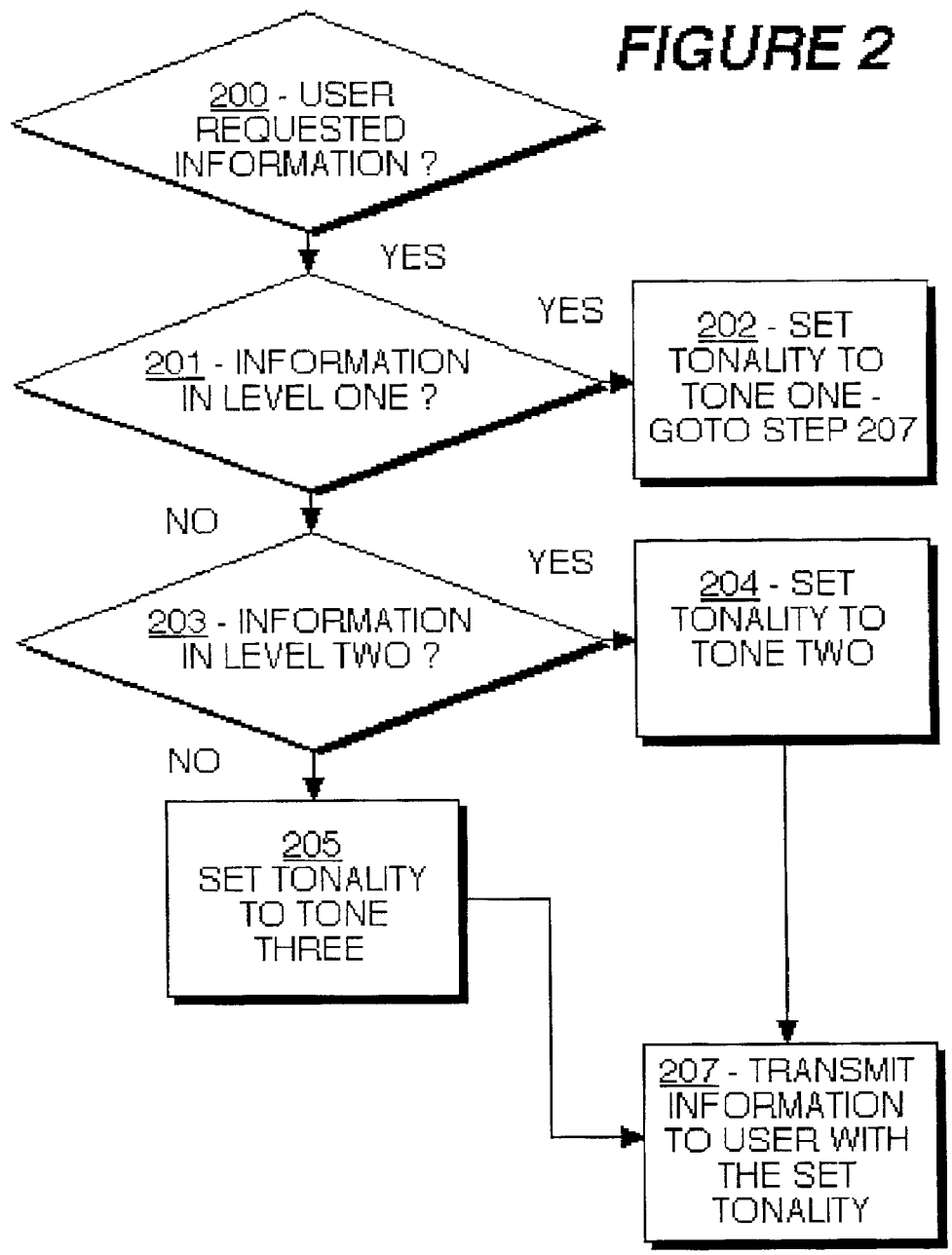
FIG. 2 is a flow chart of the processing of an audio communication for a user audio interface according to an embodiment of the present invention, broadly, and used in the preferred embodiment of which FIG. 1, as an example.

In FIG. 2, the connections and timing of the operation of the components are described for transmission of information to the user, as controlled by software in the computer system 401, or by hardware connections or a combination of hardware and software of FIG. 4.

Step 200, FIG. 2: The software, when in the VUI mode of the system apparatus including 401,405, waits for a user command that requests information, after operation 100 of FIG. 1. A user command is entered by the user 402 of FIG. 4, by voice through a microphone, by a touch pad, by a touchtone of a telephone, or by a keyboard, e. g., with the transmitter portion of the receiver/transmitter 403. The receiver/transmitter 403 is connected to the input-output port (I/O) 404 of the VUI 405 by a transmission line 406. The transmission line 406 has a bandwidth of sufficient capacity, etc. to be of voice grade, and may comprise alone or in combination such standard lines as telephone, IR (infra red), satellite, networks, built-in bus, or direct cabling. The VUI 405 has a bus 407 to connect the various components of the VUI, one of which is an input-output port (I/O) 404, which is connected to the transmission line 406 to receive the user command and place it on the bus 407. The voice analyzer and command recognition circuit 409 takes the user command off of the bus 407, in accordance with operation 101 of FIG. 1. The user command is analyzed, recognized and if necessary, parsed, so that one or more corresponding computer system commands are then placed on the bus 407. The voice analyzer circuit, a portion of voice analyzer and command recognition circuit 409, evaluates the characteristics of human voices, such as the amplitude-vs.-frequency function or the amplitude-vs.-time function, e.g. with a filter for passing, suppressing, or modifying voice frequencies.

Step 201, FIG. 2: From the bus 407, the computer system command from the voice analyzer and command recognition circuit 409, is sent by the input-output port (I/O) 410, to the computer system 401. The computer system 401 interprets the computer system command, and the VUI application software accordingly determines the level or group and the set of the requested information. The set of information is retrieved from the storage of the computer system 401 and placed on the bus 407 through the I/O 410 and a level indicating signal is also placed on the bus 407 through the I/O 410 (in this example, it indicates level one).

Step 202, FIG. 2: The level indicating signal is removed from the bus 407 by a selector 411 that then sets its output to the appropriate tone of the appropriate key, which in the case of level one is the tone "D" of the key of "D", and initializes the tone oscillator, or tone generator 408; therefore: the tone one, or tonic is sent to the audio frequency signal generator 412 for preceding the units of information. The tone generators 408 may be oscillators for producing simple audio-frequency signals for communications.

Step 207, FIG. 2: The audio frequency signal generator 412 provides an audio frequency carrier signal to the speech synthesizer 413. The speech synthesizer modulates the carrier signal in accordance with the units of information (e. g. words or syllables) taken from the bus 407 and adds timbre to thereby generate a signal that is an electronic representation of the spoken units of information, which passes from the bus through the I/O 408 to be transmitted to the user, for example over the transmission line 406 to the receiver 403. The audio-frequency (AF) signal generator 412 may be an audio oscillator that is well known and delivers an output signal in the frequency range 20 Hz to 20 kHz. Some instruments of this type operate above and below the limits of the common audio-frequency spectrum (e.g., 1 Hz to 1 MHz). The audio-frequency (AF) signal generator is a part of the voice transmitter 411–413.

Figure 5:
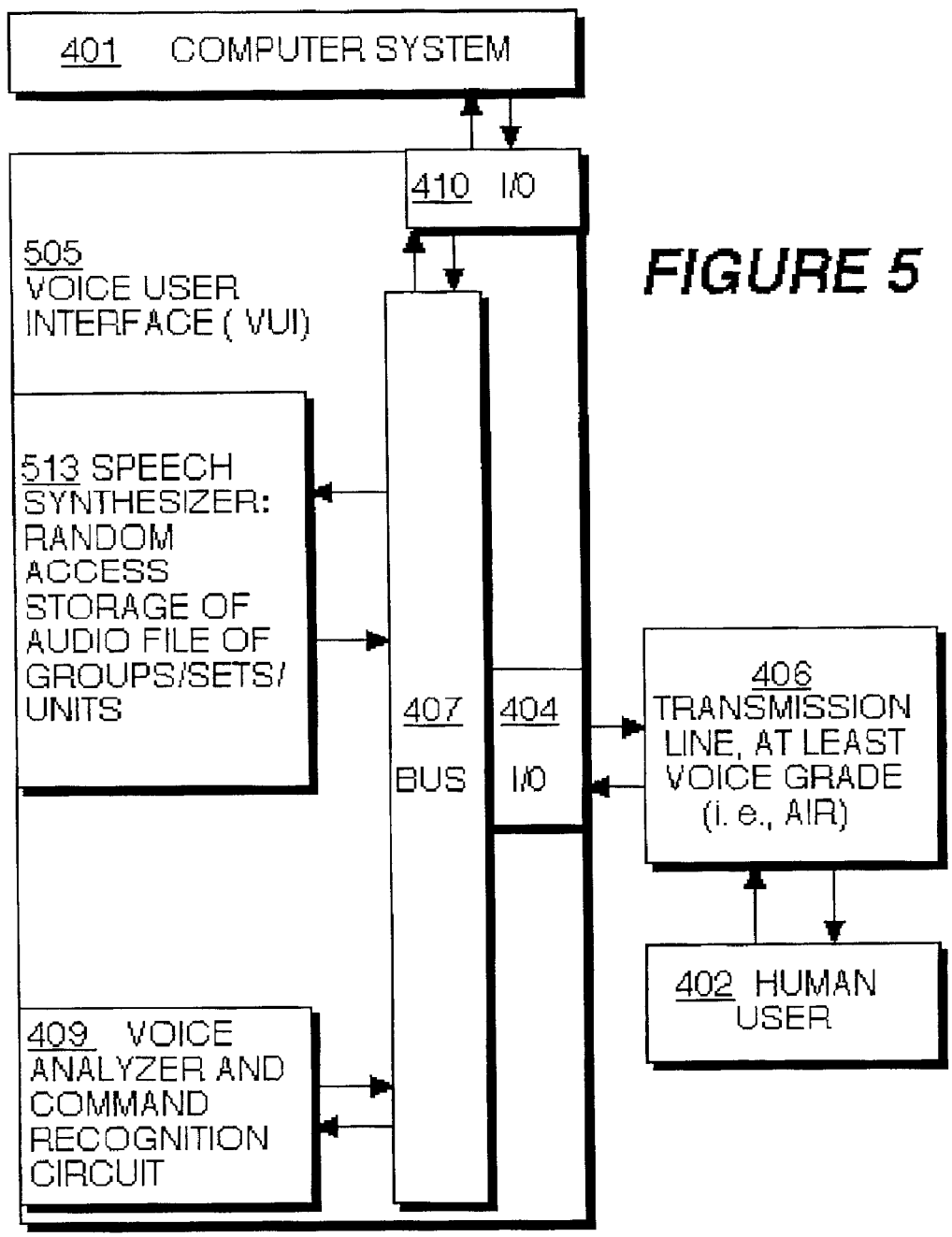
FIG. 5 is a schematic of apparatus of another embodiment to implement the present invention.

An example of an equivalent embodiment of the VUI or information system of the present invention is shown in FIG. 5, and the figure comprises a schematic showing connection of per se currently standard, well known components (or their equivalents as determined by the guidance of their function within the inventor's problem, cause and solution analysis) operable in an information environment. Preferably, the information environment is a computer system wherein a general purpose computer is programmed according to FIGS. 1 and 3. As shown in FIG. 5, the speech synthesizer, audio frequency signal generator 412 and selector 411 may be replaced by a digital recording of all of the units of information, which are randomly accessed by the computer system commands from the voice analyzer and command recognition circuit 409. Further if the user command is in a form recognized by the computer system, for example a keyboard entry or entered number by the user, the user command may be sent directly to the computer system, and in such cases of the equivalent structure, the VUI is embodied completely in the computer system that is a general purpose computer programmed with the VUI program and having the stored information.

Steps 203 and 204, FIG. 2: These steps correspond to steps 201 and 202, respectively, and are conducted for the second unit of information of a set, according to the control of the selector 411.

Steps 203 and 205, FIG. 2: These steps correspond to steps 201 and 202, respectively, and are conducted for the third unit of information of a set, according to the control of the selector 411.

The voice-frequency carrier transmits the voice or audio-frequency over the transmission line 406 (line and attendant equipment suitable for the transmission of speech and certain other information, such as control signals, digital data, etc.; the line may be a radio broadcast link, an optical signal within a wave guide or not, an electric coded signal, infra-red signal and the like commonly used for signal transmission but when the user is a human, such a line should at least end with an acoustic transducer, e.g. a speaker.) having a voice-frequency bandwidth that includes the audio-frequency range of human hearing. The voice grade transmission line 406 is a communications system with a band pass capable of transferring a human voice with reasonable intelligibility, and has a voice-grade channel, which may include a radio telephone transmitter, a speech amplifier-modulator channel suitable only for voice frequencies.

The computer system 401 typically includes a bus or other communication mechanism for communicating information, a processor coupled to the bus for processing information received as commands from a main memory, such as a random access memory (RAM) or other dynamic storage device, coupled to the bus for storing information and instructions to be executed by the processor. The main memory can also be used for storing temporary variables or other intermediate information during execution of instructions by the processor. The computer system typically further includes a read only memory (ROM) or other static storage device coupled to the bus for storing static information and instructions for the processor. A storage device, such as a magnetic disk or optical disk, typically is coupled to the bus for storing information and instructions.

The computer system 401, of FIG. 4, typically includes, coupled via the bus, a display, such as a cathode ray tube (CRT), liquid crystal display, active matrix display, or plasma display, for displaying information. An input device, such as a keyboard including alphanumeric and other keys, typically is coupled to the bus for communicating information and command selections to the processor by the human user, which in the present invention may be used as an alternative to the illustrated voice communication from the human user to the system as a whole. Another type of user input device is cursor control, such as a mouse, a trackball, touchtone keypad of a telephone or cursor direction keys for communicating direction information and command selections to the processor and optionally for controlling cursor movement on the display. The computer system 401 has a storage dividing and storing information retrievable in groups, each group comprising sets of information units that correspond to one of words and syllables.

The information being transmitted to the user in the present invention may be sent alone or simultaneously along with other sounds (such as music, children playing, wind in trees, ocean waves, chirping birds, etc.). The information to be conveyed, preferably by voice, is generally louder than the other sounds. The unique tonality may involve unique voice prints, i.e. having a graphic representation of the speech frequencies (timbre, i.e. other than pitch or tone) produced by an individual and used as a means of identifying that individual and correspondingly identifying the level of the information.

The VUI 405 interconnects and provides compatibility between at least one transmitter of information and at least one user of the information. The interface provides interaction (as only a one way voice communication from a machine to the human user according to the broader aspects of the present invention, or as in the preferred embodiment, mutually as a two way dialog between machine and human user) influence of one circuit or device on the behavior of another, as in a computer display device with which its operator can supply data to the computer for choices of information to be provided by the computer system. Such interface provides an efficient pathway for information or data, and in such case the interface is collectively the hardware and software that allows a computer to interact, e.g. with its human operator/user.

The speech synthesizer 413 is well known per se and translates signals (e.g. binary digital signals) from a machine (such as a computer, control system, servomechanism, command network in which the chain of command is rigorously defined and followed, or robot) into audible, coherent spoken words, phrases or sentences, using an electronic device that translates the signals from the machine. The audio-frequency range of human hearing is about 20 Hz to 20,000 Hz. The range of human speech is from about 60 Hz to 8000 Hz. The frequencies within the audio pass band of a typical single-sideband voice transmitter or receiver may have a lower limit of 200 Hz to 300 Hz and an upper limit of about 2500 Hz to 3000 Hz. An audio channel is the portion of a complex signal or waveform used to convey audio information exclusively.

The embodiment of the invention, as shown in FIG. 5, is similar to the embodiment of FIG. 4, but without use of the receiver/transmitter 403. The speech synthesizer 513 does not include the audio frequency signal generator 412 and selector 411, but has a random access storage of audio file of groups of sets of units of information as words or syllables recorded as an audio file from a real human voice or a synthesized human voice preceded by the proper tonality as described with respect to the embodiment of FIG. 4, for example as an mp3 or mp4 file. The computer system 401, as a variation, could have the speech synthesizer 513. In either case, as in FIG. 4, their is a storage dividing and storing information retrievable in groups, each group comprising sets of information units that correspond to one of words and syllables, in a form representative of prerecorded voice units of information preceded by the previously described tone unique to the group or level in a key that is common to all of the groups or levels, thereby providing a musical progressions of tones in navigating through the groups or levels. Such unique preceding tone and units of information are read out of the memory by the execution of the user request commands from the voice analyzer and command recognition circuit 409 and by initiation of the VUI. Execution of the arrangement of instructions contained in main memory in accordance with the commands causes the computer system to perform the process steps described herein.

In FIG. 5, The I/O 404 specifically includes a speaker and microphone to transmit the voice communications over the transmission line 406, which in this case is the environmental air as the medium for the acoustic transmissions. In both FIGS. 4 and 5, all of the herein transmission lines may be used as one way voice or two way voice interfaces, and the user may also enter commands from any conventional peripheral input directly or indirectly over a network.

The method of operating the FIG. 5 embodiment and programming the VUI should be clear from the prior discussions relating to FIGS. 2 and 4, in conjunction with FIG. 6.

In alternative embodiments, hard-wired circuitry may be used in place of or in combination with software instructions to implement the embodiment of the present invention. Thus, embodiments of the present invention are not limited to any specific combination of hardware circuitry and software. Systems that implement the present invention are not limited to any particular type of data container or database architecture. Other architectures may use other terminology.

Both the preferred forms of the embodiments of FIGS. 4 and 5 provide successive information units as voice units in groups or at levels, which groups or levels are identified to the user by a musical progression of tones of a musical key, which tones are unique for each of the groups, which unique key is used by the human user as a navigation aid to determine the group to which the units belongs. Each musical progression of tones is most preferably the I, IV, V musical progression in the corresponding musical key; each musical progression starts from the tonic tone of the musical key and returns to the tonic tone to repeat the musical progression as the user navigates through the levels and returns to the level one group. Successive tones of each musical progression of tones ascend in pitch in one direction of a hierarchy of the information units and descend in pitch in the other direction of the hierarchy.

Unless otherwise indicated, the VUI or IVR includes, but not necessarily, the computer system as a component.

As a further embodiment of the present invention, the computer system may include the VUI or IVR, for example, as follows. In a general purpose Macintosh computer, such as a G3 or G4 by Apple Computer, the operating system and system software includes Apple's speech recognition program called Speakable Items, which has a vocabulary that can be customized and is designed for navigation, not dictation. The computer can be told to always listen or upon an event such as while keys are pressed or when called by a name by a human user; the name World Corn may be entered by the programmer entering the name in the Name text box. The system software also has Speech control, which is Text-to-Speech, available in English and Spanish spoken in twenty different voices, which enables the computer to read out loud what is on its screen, which may be a web page or an Apple Works document. Therefore, for use with the present invention, an event such as the dial up of a WorldCom web page or the user using the name WorldCom would start the speech recognition program Speakable items, which would be used with special commands to call up a web page or text document from Apple works and read it in one voice with the tonality unique to the level, through Speech control; and then the computer system would bring up other pages in response to voice commands from the user and read those in succession with the tonality unique to the level, as an aid to navigation. The user and computer may communicate using the computer's I/Os of the built-in voice pick-up microphone, speaker, telephone modem, fire-wire or USB (or any combination of the above) directly by voice or indirectly over the Internet, a LAN, a peripheral, etc.

CONCLUSION

Accordingly, a VUI, IVR or similar system provides information with a signal of tonality unique to the group or level of that information, whereby the user is more aware of navigation within the system, for improved user friendliness, particularly with a musical progression of tonality provided when navigating plural levels.

While the present invention has been described in connection with a number of embodiments and implementations, the present invention is not so limited but covers various obvious modifications and equivalent arrangements, which fall within the purview of the appended claims.

What is claimed is:

1. A method of communicating information to a human user, comprising:

providing information in groups;

sending at least one group of the information as a voice transmission with a tonality unique to the at least one group that distinguishes the at least one group from others of the groups;

preceding successive groups of the information respectively by a tone unique to each group, with the tones of the groups being a musical progression of tones of a musical key;

starting the musical progression with the tonic tone of the musical key; and ascending frequency of the tones that are unique to the groups in one direction of a hierarchy of the groups and descending frequency of the tones that are unique to the groups in the other direction of the hierarchy.

2. The method of claim 1, employed as an interactive voice recognition (IVR), including:

receiving and recognizing user tone commands for navigation of the groups of the information.

3. The method of claim 1, employed as a voice user interface (VUI), including:

receiving and recognizing user voice commands for navigation of the groups of the information.

4. An information system, comprising:

storage having information retrievable in groups, each group corresponding to one of words and syllables;

means for sending, to a human, each of the groups of the information as a voice transmission preceded by a unique tone of a musical key that distinguishes each group from others of the groups; and means for providing the tones of successive groups as a musical progression in the musical key from the tonic tone of the musical key, wherein successive tones of each musical progression of tones ascend in pitch in one direction of a hierarchy of the groups and descend in pitch in the other direction of the hierarchy.

5. The system of claim 4, wherein:

the musical progression of tones is the I, IV, V musical progression in the musical key.

6. The system of claim 5, further including:

means for responding to and recognizing user voice commands for navigation of the groups of the information; and wherein said means for responding to and recognizing together with said means for sending are for a two way voice user interface (VUI).

7. The system of claim 4, further including:

means for responding to and recognizing user voice commands for navigation of the groups of the information; and wherein said means for responding to and recognizing together with said means for sending are for a two-way user interface.

8. An information system, comprising:

storage having information retrievable in groups, each group comprising sets of information units that correspond to one of words and syllables; and an interface for voice transmitting each group preceded by a unique tone, which tones are in a single musical key, so that the tones distinguish each group from the other groups to a human, whereby the unique tones provide a human user navigation aid to identify the group to which the units belongs, wherein:

successive tones form a musical progression of the tones that ascends in pitch in one direction of a hierarchy of the groups and descend in pitch in the other direction of the hierarchy of the groups.

9. The information system of claim 8, further comprising:

an input to receive user commands; and an analyzer and command recognizer connected to receive user commands input and issue corresponding system commands.

10. The information system of claim 8, further comprising:

a VUI input to receive user voice commands; and a voice analyzer and command recognizer connected to receive user voice commands from said VUI input and issue corresponding system commands.

11. A method for providing a user interface to navigate through information, comprising:

assigning a plurality of tonalities to a respective plurality of information groups for identifying the information groups that are arranged hierarchically; and presenting one of the information groups as a voice transmission with the corresponding tonality to a user, wherein successive ones of the information groups of the information correspond to a musical progression of tones of a musical key, and ascending frequency of the tones are associated with the information groups in one direction of the hierarchy and descending frequency of the tones are associated with the information groups in another direction of the hierarchy.

* * * * *